(12) United States Patent
Zhang et al.

(10) Patent No.: US 8,825,606 B1
(45) Date of Patent: Sep. 2, 2014

(54) COMMUNITY BASED RESTORE OF COMPUTER FILES

(75) Inventors: Zhengbao Zhang, Nanjing (CN); Zhentao Huang, Nanjing (CN); Zhihe Zhang, Nanjing (CN); Qiang Zhuo, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 29 days.

(21) Appl. No.: 13/348,901

(22) Filed: Jan. 12, 2012

(51) Int. Cl.
*G06F 7/00* (2006.01)
*G06F 17/00* (2006.01)

(52) U.S. Cl.
USPC .......................................... 707/679

(58) Field of Classification Search
USPC ................................. 707/687, 679
See application file for complete search history.

(56) References Cited

U.S. PATENT DOCUMENTS

| | | | |
|---|---|---|---|
| 5,375,240 A | 12/1994 | Grundy | |
| 5,634,052 A * | 5/1997 | Morris | ........................... 707/640 |
| 6,282,610 B1 | 8/2001 | Bergsten | |
| 6,345,368 B1 | 2/2002 | Bergsten | |
| 7,865,471 B1 * | 1/2011 | Stagg | ............................. 707/640 |
| 7,962,956 B1 | 6/2011 | Liao et al. | |
| 8,612,398 B2 * | 12/2013 | Jarrett et al. | .................. 707/692 |
| 2004/0158730 A1 | 8/2004 | Sarkar | |
| 2005/0193272 A1 | 9/2005 | Stager et al. | |
| 2005/0216536 A1 | 9/2005 | Stager et al. | |
| 2006/0080737 A1 | 4/2006 | Freeman et al. | |
| 2006/0107006 A1 | 5/2006 | Green et al. | |
| 2006/0137010 A1 | 6/2006 | Kramer et al. | |
| 2006/0139697 A1 | 6/2006 | Fuente | |
| 2006/0143413 A1 | 6/2006 | Agombar et al. | |
| 2006/0195493 A1 | 8/2006 | Chang et al. | |
| 2007/0100905 A1 | 5/2007 | Masters et al. | |
| 2007/0185922 A1 * | 8/2007 | Kapoor et al. | ................. 707/202 |
| 2007/0186127 A1 * | 8/2007 | Desai et al. | ...................... 714/13 |
| 2008/0016353 A1 * | 1/2008 | Carro | ............................ 713/171 |
| 2008/0047013 A1 | 2/2008 | Claudatos et al. | |
| 2008/0104090 A1 * | 5/2008 | Akelbein et al. | .............. 707/100 |
| 2010/0169972 A1 * | 7/2010 | Kuo et al. | ........................ 726/23 |
| 2011/0138079 A1 * | 6/2011 | Esaka et al. | .................... 709/248 |
| 2011/0213625 A1 * | 9/2011 | Joao | .................................. 705/3 |

\* cited by examiner

*Primary Examiner* — Cam Truong
(74) *Attorney, Agent, or Firm* — Okamoto & Benedicto LLP

(57) ABSTRACT

A computer network includes endpoint computers and a file history server with a file history database. An endpoint agent in an endpoint computer detects file access events in the endpoint computer and generates file activity data for storage in the file history database. The file activity data may include file access event information of file access events and file information of files involved in the file access events. The endpoint agent may consult the file history database to locate a duplicate of a damaged file in another endpoint computer, and restore the damaged file using the duplicate. A backup and restore program may also consult the file history database to determine whether or not to make a backup copy of a file involved in a file access event.

10 Claims, 5 Drawing Sheets

COMMUNITY BASED RESTORE OF COMPUTER FILES

BACKGROUND OF THE INVENTION

1. Field of the Invention

The present invention relates generally to computer security, and more particularly but not exclusively to methods and apparatus for restoring computer files.

2. Description of the Background Art

Computer files may be damaged for a variety of reasons including by computer virus infection, improper closing, and access error, to name some examples. Files may be backed up as a precautionary measure; a damaged file may be restored using its backup copy, if one is available. Some backup and restore solutions involve using a real time hook to detect when a file is being modified, and to backup the file before modification. Other back up and restore solutions involve making backups of files on a periodic basis. One deficiency of these solutions is that they consume a lot of system resources, such as processor time and disk space. Backing up hundreds and thousands of files, as in an enterprise environment, requires a lot of I/O (input/output) processing and may flood the computer network in the event the backup storage space is not local. This scenario is particularly troublesome during massive virus infections, which may trigger large amounts of clean files to be backed up as a precautionary measure. Another deficiency of these backup and restore solutions is that they do not provide information that may be used in understanding the virus infection.

SUMMARY

In one embodiment, a method of restoring computer files includes detecting a first file access event involving access of a first file in a first computer. A first file activity data is stored in a remotely located file history database, the first file activity data including information on the first file access event and information on the first file. A second file access event involving access of a second file in a second computer is detected. A second file activity data is stored in the file history database, the second file activity data including information on the second file access event and information on the second file. The first file is detected in the first computer as being damaged. A duplicate of the first file is determined to be available from the second computer based on information from the file history database. The duplicate of the first file is received in the first computer. The first file is restored in the first computer using the duplicate of the first file.

In another embodiment, a method of restoring computer files includes detecting that a first file is being modified in a first computer. In response to detecting that the first file is being modified, a remotely located file history database is consulted to determine whether or not the first file has a duplicate available from another computer. A first result of consulting the file history database is received in the first computer. Based on the first result indicating that the first file has a duplicate available from another computer, a backup of the first file is not made before modifying the first file.

In another embodiment, a computer network comprises a plurality of endpoint computers, each of the endpoint computers being configured to provide file activity data to a first server computer, the file activity data comprising file information of a file involved in a file access event and file access event information of the file access event, and the first server computer storing received file activity data from the plurality of endpoint computers in a file history database.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
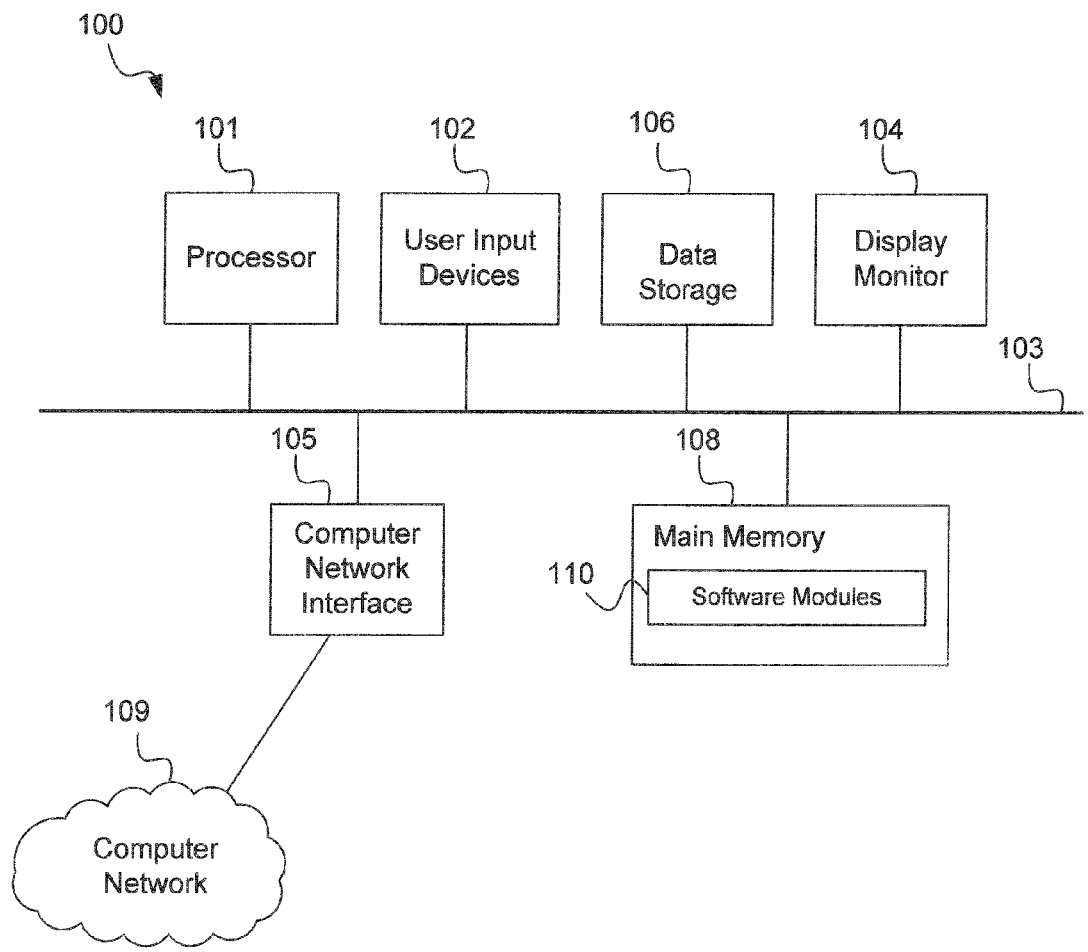
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computers described below. The computer 100 may have fewer or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. The computer 100 may be configured to perform its functions by executing the software modules 110. The software modules 110 may be loaded from the data storage device 106 to the main memory 108. The software modules 110 may also be made available in other computer-readable medium including optical disk, flash drive, and other memory devices.

Figure 2:
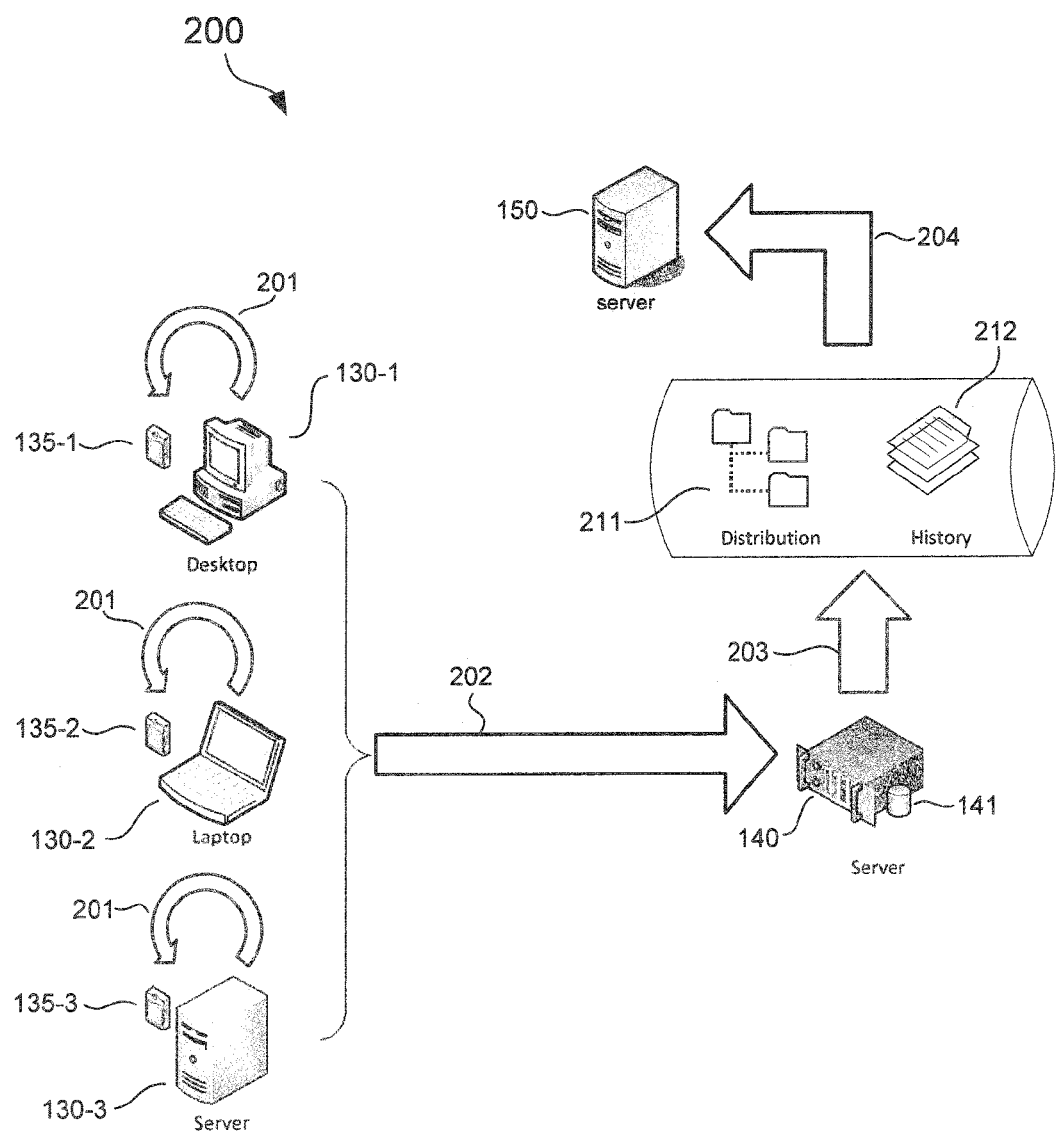
FIG. 2 shows a schematic diagram of a computer network in accordance with an embodiment of the present invention.

FIG. 2 shows a schematic diagram of a computer network 200 in accordance with an embodiment of the present invention. The computer network 200 may be a private enterprise computer network, e.g., a computer network used by a corporation, government, and other organization with multiple users. In the example of FIG. 2, the computer network 200 includes a plurality of endpoint computers 130 (i.e., 130-1, 130-2, 130-3, etc.), a file history server computer 140, and a security server computer 150. These computers may communicate with each other using conventional protocols for communicating over a computer network.

The endpoint computers 130 may comprise computers where computer executable files may be found, such as desktop and laptop computers employed by users or a central server computer, for example. In contrast to a data file, an executable file comprises computer-readable program code executable by a processor. In the example of FIG. 2, each endpoint computer 130 includes an endpoint agent 135 (i.e., 135-1, 135-2, 135-3, etc.). An endpoint agent 135 may comprise computer-readable program code for identifying executable files locally stored on a corresponding endpoint computer 130, gathering executable file information (e.g., metadata, hash value, file size, file location) of the identified executable files, detecting executable file access events (see arrows 201), gathering file information of executable files involved in file access events, and communicating with the file history server computer 140 (see arrow 202) to report file activity data and to receive information on executable files available from other endpoint computers 130 in the computer network 200. The endpoint agent 135 provides file information, but not the executable files themselves, to the file history server computer 140.

The file history server computer 140 may comprise a server computer configured to receive file activity data from the plurality of endpoint computers 130. The file activity data may include executable file access event information and file information of executable files involved in the executable file access event. An executable file access event comprises an event where an executable file is created, renamed, modified (i.e., written), moved to another location, and/or deleted. In one embodiment, an executable file access event does not include reading or execution of an executable file. An executable file access event information may include the type of the detected executable file access event (e.g., renaming, modification, creation, deletion, file movement), the processes or executable programs involved in the executable file access event, the location (e.g., full path) of the executable file involved in the executable file access event, the date and time the executable file access event occurred, and other information relating to the executable file access event. The file history server computer 140 receives file information of executable files, but not the executable files themselves.

The file history server computer 140 may be configured to store received file activity data in the file history database 141, and generate file history reports and other information that can be generated from the contents of the file history database 141. The file history database 141 may be a database, listing, table, or other compilation of information. The file history server computer 140 may be configured to provide the file history reports to other computers on the computer network 200 (see arrow 203). For example, the file history server computer 140 may be configured to generate a distribution list 211 and a file change history 212 from information stored in the file history database 141. The distribution list 211 may comprise a listing of locations and file information of executable files stored in the endpoint computers 130, while the file change history 212 may comprise a report of executable file access events in the endpoint computers 130.

The file history server computer 140 may provide the distribution list 211 and/or the file change history 212 to the security server computer 150 (see arrow 204) for further processing and analysis. The security server computer 150 may comprise a server computer for analyzing information reported by the file history server computer 140 for computer security-related purposes. For example, the security server computer 150 may use information from the distribution list 211 and the file change history 212 to identify the source of a computer virus infection and the propagation history of the computer virus. As another example, the security server computer 150 may include a correlation engine to correlate and detect abnormal executable file access events indicated in the file change history 212, and accordingly send a warning notification to the network administrator.

Figure 3:
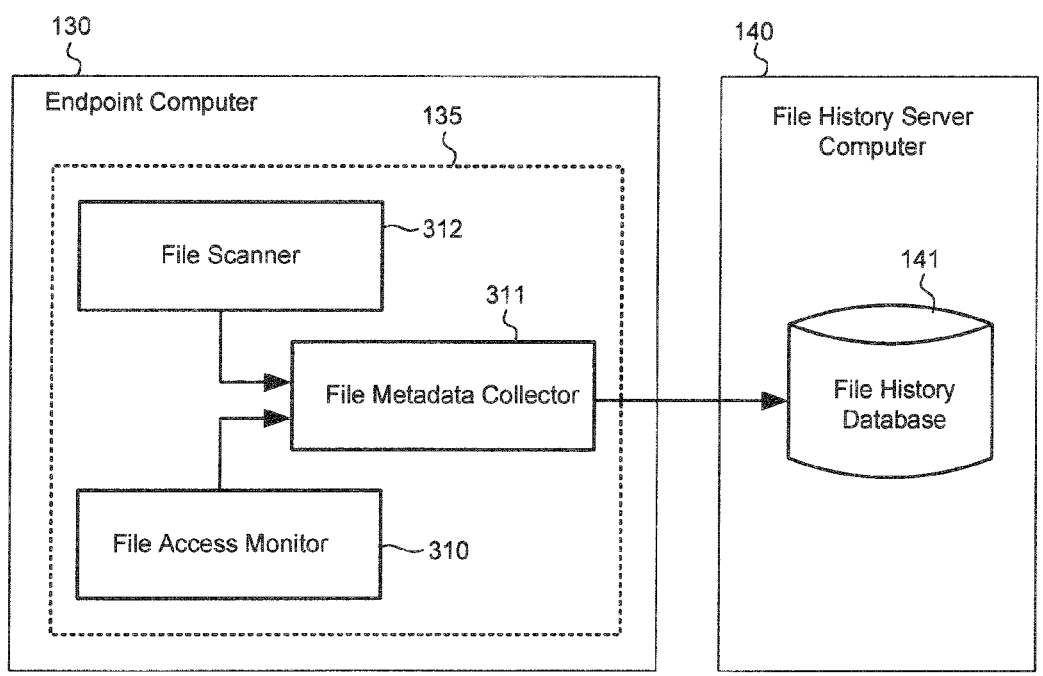
FIG. 3 schematically illustrates further details of an endpoint computer and a file history server computer in accordance with an embodiment of the present invention.

FIG. 3 schematically illustrates further details of an endpoint computer 130 and the file history server computer 140 in accordance with an embodiment of the present invention. In the example of FIG. 3, an endpoint agent 135 comprises the following modules: a file access monitor 310, a file metadata collector 311, and a file scanner 312. The file access monitor 310 may comprise computer-readable program code for detecting executable file access events, such as file creation, renaming, modification (i.e., content change), file movement, and/or deletion of executable files. The file access monitor 310 may be implemented as a real-time file monitor that detects, but does not block, executable file access events, and reports the executable file access event information to the file metadata collector 311. The executable file access event information may include the type of the executable file access event (e.g., renaming, modification, file movement, creation, deletion), the processes or executable programs involved in the executable file access event, the location of the executable file involved in the executable file access event (i.e., the executable file being modified, moved to another location, renamed, created, deleted), the date and time the executable file access event occurred, and other related information.

The file metadata collector 311 may comprise computer-readable program code for processing executable file access event information received from the file access monitor 310, gathering file information (e.g., metadata, size, hash value, file location) of executable files involved in the executable file access events, and communicating with the file history server computer 140 to report corresponding file activity data, which may include the executable file access event information and file information of the executable file involved in the executable file access event, for storage in the file history database 141. In one embodiment, file metadata may include the original name of the executable file (i.e., as indicated in the metadata), the version of the executable file, a product name, and a signature (e.g., a digital signature of the vendor of the executable file). The hash of an executable file may be calculated using a hash algorithm, such as SHA1, for example. The file metadata collector 311 provides executable file access event information and file information to the file history server computer 140 as file activity data. The file history server computer 140 stores the file activity data in the file history database 141.

In one embodiment, the file metadata collector 311 is further configured to communicate with the file history server computer 140 to determine a location of a duplicate of a damaged executable file, communicate with another file metadata collector 311 to request the duplicate, to receive the duplicate from the other file metadata collector 311, and to use the duplicate to restore (e.g., replace) the damaged executable file.

The file scanner 312 may comprise computer-readable program code for locating executable files locally available on the corresponding endpoint computer 130 and to obtain file information of the executable files, including metadata, file hash value, file size, and file location (e.g., full folder path). The file scanner 312 may be configured to provide the location and file information of identified executable files to the metadata collector 311. The file scanner 312 may be executed as a starting point to collect baseline information about the executable files, and by schedule to ensure that collected file information and location are not out of date. The file scanner 312 may provide the file information and location to the file metadata collector 311, which forwards the file information and location to the file history server computer 140 for storage in the file history database 141.

As explained, the file history database 141 includes executable file access event information, file information of executable files involved in the executable file access events, and location of executable files available in the computer network 200. In one embodiment, an endpoint agent 135 is configured to restore a damaged executable file using a duplicate of the executable file but available from another endpoint agent 135. The duplicate is not necessarily a backup copy of the executable file being restored; that is, the duplicate is not necessarily made or copied from the executable file. This aspect of the present invention is now discussed with reference to FIG. 4.

Figure 4:
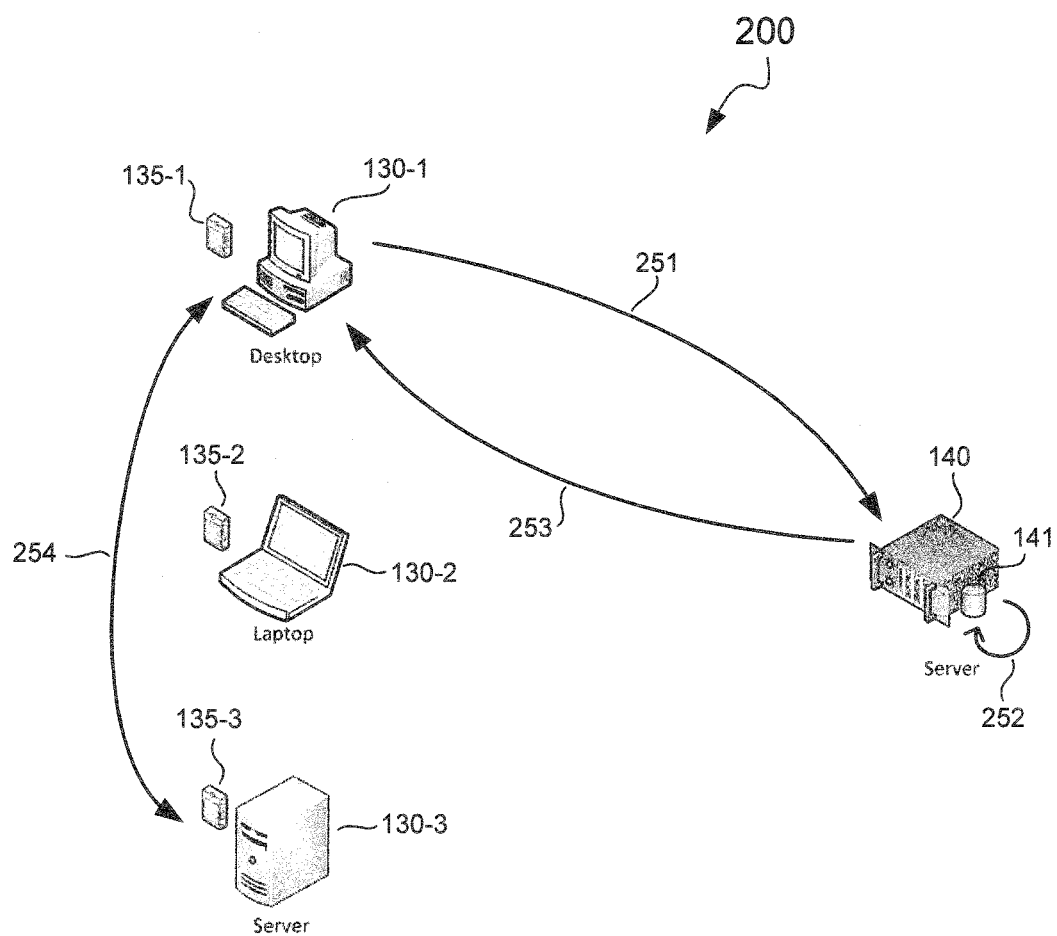
FIG. 4 schematically illustrates restoring a damaged file in accordance with an embodiment of the present invention.

FIG. 4 schematically illustrates restoring a damaged executable file in accordance with an embodiment of the present invention. In the example of FIG. 4, an endpoint agent 135-1 (or another component of the endpoint computer 130-1) detects a damaged executable file in the endpoint computer 130-1. The endpoint agent 135-1 provides file information of the damaged executable file to the file history server computer 140 (see arrow 251). The file information includes the hash value, size, and metadata of the damaged executable file. Using the file information received from the endpoint agent 135-1, the file history server computer 140 searches the file history database 141 (see arrow 252) for another executable file matching the file information of the damaged executable file. As can be appreciated, the file information of the damage executable file received from the endpoint agent 135-1 may not exactly match other file information stored in the file history database 141 depending on the damage. However, using the received file information of the damaged executable file in conjunction with file access event information and file information of the damaged executable file prior to the damage, the file history server computer 140 may be able to identify another executable file with the same or very similar file information. For example, the file history server computer 140 may be configured to identify a previous, undamaged version of the damaged executable file based on previous executable file access events involving the executable file before it has been damaged, and use file information of the previous version to find a duplicate with which to restore the damaged executable file.

The file history server computer 140 informs the endpoint agent 135-1 of the location of a duplicate that is suitable for restoring the damaged executable file (see arrow 253). In the example of FIG. 4, the file history server computer 140 identifies the endpoint computer 130-3 as having the duplicate for restoring the damaged executable file. Accordingly, the endpoint agent 135-1 communicates with the endpoint agent 135-3 (see arrow 254) to request and receive the duplicate. The endpoint agent 135-1 then replaces the damaged executable file with the duplicate received from the endpoint agent 135-3. As can be appreciated, the endpoint computer 130-3 is another endpoint computer on the computer network 200, and also provides file activity data with file information and executable file access event information to the file history server computer 140 for storage in the file history database 141, which is remotely located from the endpoint computers 130. In marked contrast, conventional backup and restore solutions require dedicated backup storage space and backup copies of individual executable files, i.e., each executable file needs a backup that is made by copying the executable file.

The inventive method of restoring computer files described herein is community based in that a damaged executable file is replaced with a duplicate of the executable file, but the duplicate is not necessarily from a backup of the executable file or copied from an earlier version (i.e., pre-damage) of the executable file. The duplicate may be just another executable file available from another endpoint computer, and may have been installed in that endpoint computer independent of the damaged executable file. That is, the method does not necessarily require making backup copies of computer executable files periodically or before modification. Although this may not completely guarantee that an executable file will have a corresponding duplicate somewhere on the network, it is especially effective in enterprise computer networks because redundant duplicates of executable files are usually available in such networks. In other words, there is homogeneity of executable files in an enterprise environment, with most endpoint computers having the same or similar operating systems, applications, etc. For example, a study performed by the inventors in one enterprise computer network indicates that about 44% of executable files have at least two copies available locally, about 26% of executable files have one copy available in each or most endpoint computers on the network, about 13% of executable files are unique in that there is only one copy on the entire network, and about 17% of executable files are rare in that there are only 2-5 copies on the entire network. In other words, the study indicates that only about 30% of executable files need some form of backup. This means that relatively very few executable files need backup copies in an enterprise computer network. To cover the remaining files that need backup, embodiments of the present invention may also be employed in conjunction with a backup and restore system to minimize network bandwidth and I/O processing consumption to perform backups as now explained with reference to FIG. 5.

Figure 5:
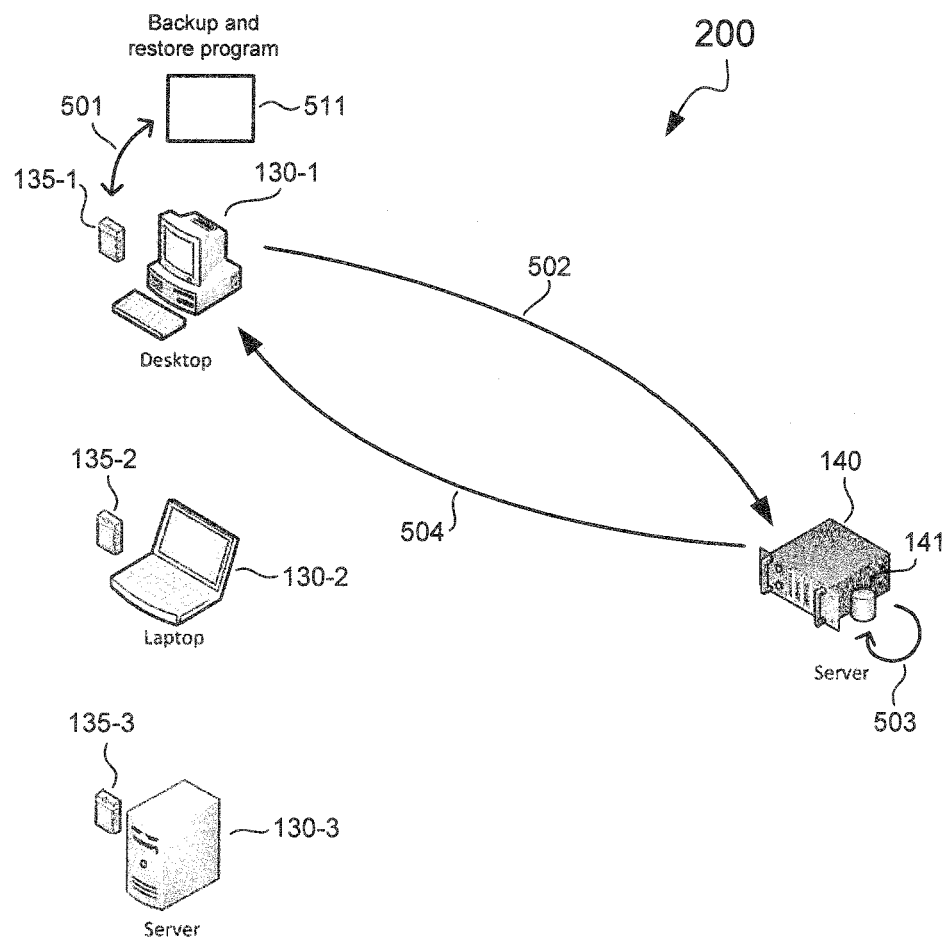
FIG. 5 schematically illustrates backup and restore of computer files in accordance with an embodiment of the present invention.

FIG. 5 schematically illustrates backup and restore of computer files in accordance with an embodiment of the present invention. In the example of FIG. 5, the endpoint computer 130-1 (and other endpoint computers 130) further includes a backup and restore program 511. The backup and restore program 511 may comprise computer-readable program code for backing up and restoring files of the endpoint computer 130-1. The backup files may be stored locally on the endpoint computer 130-1 or remotely on another computer. The endpoint agent 135-1 and other components of the computer network 200 operate in the same manner as previously described.

In the example of FIG. 5, the endpoint agent 135-1 is further configured to communicate with the backup and restore program 511 (see arrow 501) to report executable file access events. This allows the backup and restore program 511 to determine whether or not to create a backup of the executable file involved in an executable file access event. For example, upon detection of an executable file access event (e.g., modification of an executable file), the backup and restore program 511 may be configured to first determine whether or not the executable file has a duplicate somewhere in the computer network 200 and the number of available duplicates by requesting the endpoint agent 135-1 to consult with the file history server computer 140 (see arrow 502). The file history server computer 140 queries the file history database 141 (see arrow 503) to determine if the executable file involved in the executable file access event has a duplicate in another computer on the computer network 200. The file history server computer 140 provides the result of the query to the endpoint agent 135-1, which forwards the result to the backup and restore program 511. If the executable file involved in the executable file access event has a duplicate on another endpoint computer 130, the backup and restore program 511 may decide not to make a backup copy of the executable file. Otherwise, the backup and restore program 511 may create a backup copy of the executable file and store the backup copy locally or on a dedicated backup storage space somewhere on the network. The backup and restore program 511 may also create a backup copy of the executable file when the executable file is a unique or rare file (e.g., has less than six copies on the entire network) as indicated by information from the file history database 141. To restore the executable file involved in the executable file access event, the backup and restore program 511 may obtain a replacement of the executable file from a dedicated backup copy or simply from a duplicate in another computer indicated in the file history database 141 as in FIG. 4.

Information collected in the file history database 141 may be employed for various computer security related applications. For example, network administrators (or Information Technology engineers, etc.) typically know the applications that are important for the enterprise. This allows them to build a clean system, such as a new installed Windows™ virtual machine, for example, and install the important applications in it. Using an endpoint agent 135, a network administrator is able to collect file information of installed applications, and verify them in the file history database 141 (e.g., by comparing to known good file information) to detect computer virus infections.

As another example, antivirus researchers may determine how the metadata and/or file information of an executable file may be modified by a particular virus. This advantageously allows checking the metadata and file information stored in the file history database 141 to identify an executable file as infected with a computer virus without scanning the actual executable file. The checking of the file history database 141 for metadata and/or file information indicative of an infected executable file may be performed in the backend (e.g., by the security server computer 150 of FIG. 1), and accordingly will not impact the performance of the endpoint computers 130.

Yet another example, network administrators may enforce a white list (i.e., a list of approved applications) by scanning the file history change database 141. More specifically, the file history change database 141 may be consulted to identify applications that are not approved to be installed in an endpoint computer 130. The white list may also be installed in an endpoint computer 130. In that example, an endpoint agent 135 may be further configured to check local executable files to identify those that are not on the white list.

Yet another example, an antivirus may indicate in the file metadata whether or not an executable file has been scanned, the antivirus scanner version and pattern used to scan the executable file, and the result of the antivirus scanning. After the file metadata is stored in the file history database 141, other antivirus scanners may consult the file history database 141 to determine the antivirus scanning history of the executable file. This allows the other antivirus scanners to skip scanning the executable file when its metadata indicate that it has been recently scanned by an up to date antivirus scanner and was found to be clean.

Yet another example, an endpoint computer 130 may include a graphical user interface (GUI) for accessing the file history database 141. This allows users to explore the file history database 141 to discover distribution and location of executable files, file information, and other information stored in the file history database 141.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of restoring computer files, the method comprising:
   detecting a first file access event involving access of a first file in a first user computer, the first file access event comprising modification of the first file;
   the first user computer reporting a first file activity data to a remotely located file history server computer, the first file activity data including information on the first file access event and information on the first file, wherein the information on the first file access event includes a hash of the first file;
   the file history server computer storing the first file activity data in a file history database that is remotely located from the first user computer and a second user computer;
   in response to detecting that the first file is being modified in the first user computer, consulting the remotely located file history database to determine whether or not the first file has a duplicate available from another computer;
   receiving a first result of consulting the remotely located file history database;
   based on the first result indicating that the first file has a duplicate available from another computer, not making a backup copy of the first file before modifying the first file;
   detecting a second file access event involving access of a second file in the second user computer;
   the second user computer reporting a second file activity data to the file history server computer, the second file activity data including information on the second file access event and information on the second file;
   the file history server computer storing the second file activity data in the remotely located file history database;
   in response to detecting that the second file is being modified in the second computer, consulting the remotely located file history database to determine whether or not the second file has a duplicate available from another computer;
   receiving a second result of consulting the remotely located file history database;
   based on the second result indicating that the second file does not have a duplicate available from another computer, making a backup copy of the second file before modifying the second file;
   detecting in the first user computer that the first file has been damaged;
   the first user computer consulting the file history server computer to determine a location of a duplicate of the first file;
   the file history server computer informing the first user computer that the second user computer has the duplicate of the first file;
   the first user computer requesting the second user computer for the duplicate of the first file;
   the first user computer receiving the duplicate of the first file from the second user computer; and
   the first user computer restoring the first file using the duplicate of the first file received from the second user computer.

2. The method of claim 1 further comprising:
determining metadata of the first file, and wherein the information on the first file includes the metadata.

3. The method of claim 2 wherein the metadata includes a digital signature of a vendor of the first file.

4. The method of claim 2 wherein the metadata includes an original filename of the first file.

5. The method of claim 1 further comprising:
generating a file distribution list using information from the first file activity data and the second file activity data; and
providing the file distribution list to another server computer.

6. The method of claim 1 further comprising:
the file history server computer generating a file change history report using information from the first file activity data and the second file activity data; and
the file history server computer providing the file change history report to another server computer.

7. A computer network comprising:
a plurality of endpoint computers employed by users, each endpoint computer of the endpoint computers being configured to provide file activity data to a first server computer, the file activity data comprising file information of a file involved in a file access event and file access event information of the file access event, wherein the file information of the file involved in the file access event includes a hash of the file involved in the file access event; and
the first server computer storing received file activity data from the plurality of endpoint computers in a file history database that is remotely located from the plurality of endpoint computers,
wherein a first endpoint computer in the plurality of endpoint computers consults the remotely located file history database by processing the first server computer to determine whether or not a first file has a duplicate available from another endpoint computer in response to detecting that the first file is being modified in the first endpoint computer, receives a first result of consulting the remotely located file history database, does not make a backup copy of the first file before modifying the first file based on the first result indicating that the first file has a duplicate available from another endpoint computer, detects that the first file is damaged, receives information from the first server computer that a second endpoint computer in the plurality of endpoint computers has a duplicate of the first file, requests the second endpoint computer for the duplicate of the first file, receives the duplicate of the first file from the second endpoint computer, and replaces the first file in the first endpoint computer with the duplicate of the first file received from the second endpoint computer,
wherein the second endpoint computer consults the remotely located file history database by processing the first server computer to determine whether or not a second file has a duplicate available from another endpoint computer in response to detecting that the second file is being modified in the second computer, receives a second result of consulting the remotely located file history database, makes a backup copy of the second file before modifying the second file based on the second result indicating that the second file does not have a duplicate available from another endpoint computer.

8. The computer network of claim 7 wherein each of the endpoint computers is configured to consult the remotely located file history database to determine that a local file has a duplicate available from another endpoint computer and to restore the local file with the duplicate of the local file.

9. The computer network of claim 8 wherein each of the endpoint computers is configured to create a backup copy of another local file before modifying the other local file when the other local file does not have a duplicate available from another endpoint computer.

10. The computer network of claim 8 wherein each of the endpoint computers is configured to not create a backup copy of another local file before modifying the other local file when the other local file has a duplicate available from another endpoint computer.

* * * * *